United States Patent Office 2,994,696
Patented Aug. 1, 1961

2,994,696
PROCESS FOR THE PREPARATION OF VITAMIN-$B_1$ HALIDES
Akira Takamizawa, Amagasaki-shi, Kanji Tokuyama, Osaka-shi, Shigekatsu Nakajima, Nishinomiya-shi, Sadao Hayashi, Ashiya-shi, and Hisao Sato, Sakai-shi, Japan, assignors to Shionogi Seiyaku Kabushiki Kaisha (known as Shionogi & Co., Ltd.), Osaka-shi, Japan, a Japanese joint-stock company
No Drawing. Filed Dec. 23, 1958, Ser. No. 782,393
Claims priority, application Japan Dec. 22, 1957
2 Claims. (Cl. 260—256.6)

This invention relates to vitamin-$B_1$ halides and to processes for the preparation thereof.

For the preparation of vitamin-$B_1$ halides, a process comprising the steps of neutralizing the vitamin-$B_1$ halide hydrohalide with an alkaline solution to prepare a water solution of the vitamin-$B_1$ halide and isolating the desirable vitamin-$B_1$ halide from said solution is well known. This process, however, has a disadvantage in that the neutralization of the starting halide hydrohalide must be carried out with the utmost care, because if the amount of the neutralizing alkaline agent is not precisely selected, commingling of the halide hydrohalide and decomposition of $B_1$ base occur. Furthermore, said process necessitates the complicated concentration of the reaction solution under a reduced pressure to crystallize out the $B_1$ halide produced and is accompanied occasionally by decomposition of the desired product and commingling of the halide hydrohalide.

For the preparation of the vitamin $B_1$ halide, the process of carrying out the exchange decomposition of the higher monoacid salt to the lower monoacid salt with utilization of the lyotropic series of their anions has been proposed. In this process, a compound such as vitamin-$B_1$ nitrite is first converted to vitamin-$B_1$ bromide by reacting said nitrite with a sodium bromide, whereupon the vitamin-$B_1$ bromide is converted to vitamin-$B_1$ iodide by reacting said bromide with sodium iodide. This process also has a disadvantage in that the exchange decomposition necessitates an undesirable heating.

An object of this invention is to provide a novel process capable of preparing a highly pure vitamin-$B_1$ halide with a high yield and without the above-mentioned disadvantages of the known processes.

Another object of this invention is to obtain novel pure vitamin-$B_1$ halide hydrohalides which are very useful as medicine.

We have, after a series of researches, succeeded in attaining these and other objects of this invention by a process comprising the steps of converting the vitamin-$B_1$ halide hydrohalide to a neutral condition consisting in part of thiolic vitamin-$B_1$ by reacting said vitamin-$B_1$ halide hydrohalide with at least two moles of an alkaline substance, adding an excess amount of an alkali halide to the resultant product, and then adjusting the pH of the reaction mixture to about 6, and adding an acidic substance such as sodium hyposulfite or sodium thiosulfate in the cold state. According to this process, vitamin-$B_1$ halide corresponding to the alkali halide which has been added will be quantitatively deposited.

It has been reported that when a reagent such as sodium hyposulfite is reacted with vitamin-$B_1$ halide hydrohalide, the base of the vitamin-$B_1$ is decomposed, resulting in production of 2-methyl-4-aminopyrimidine-5-methyl sulfonate. According to this invention, however, such reaction is not observed at all and only the desirable vitamin-$B_1$ halide is quantitatively obtained. This is regarded as a discovery of major importance at variance with the orthodox view.

According to this invention, not only is the vitamin-$B_1$ halide quantitatively obtained, but also its purity is so high as to necessitate only one recrystallization from alcohol for the purification of the product. The properties of the illustrative vitamin-$B_1$ halides prepared by this invention are as follows.

| | Melting point, ° C. (decomposition point) | Crystal state | Water of crystallization, molecules |
|---|---|---|---|
| Vitamin-$B_1$ chloride | 130 | Cubic crystal | 1 |
| Vitamin-$B_1$ bromide | 164–165 | Flaky crystal or needle crystal | 1½ |
| Vitamin-$B_1$ iodide | 160 | Flaky crystal | 1½ |

When the above described vitamin-$B_1$ bromide is dissolved in 95% alcohol while maintaining the temperature of the solution at 40° C. to deposit the crystals therein, a cubic-crystal product melting at 190° C. will be obtained. It was found by the elemental analysis and other chemical reactions that the cubic crystal product is an anhydrous vitamin-$B_1$ bromide. When this anhydride is redissolved in an alcohol and then this solution is cooled with ice water or said anhydride is mixed with a suitable amount of acetone after dissolution thereof in a small amount of water, crystals are deposited. These crystals are vitamin-$B_1$ bromide hydrate melting at 164° C.–165° C. These crystals cannot be converted to flaky crystals melting at 190° C. even when the water of crystallization is removed. These crystals reabsorb the water of crystallization only after being allowed to stand for some time. On the other hand, even when the anhydrous crystal melting at 190° C. is permitted to stand, it cannot be converted to the water-containing crystal having a melting point between 164° C. and 165° C. In other words, the water-containing crystal and the anhydrous crystal each consisting of vitamin-$B_1$ bromide cannot be transformed from the former to the latter or vice versa. The water-containing crystal and the anhydrous crystal mentioned above are entirely different substances, their difference having been proved by our researches utilizing infrared spectroscopy, whereby we have found that there are two kinds of vitamin-$B_1$ bromides. It has been reported that the melting point of the vitamin-$B_1$ chloride is 131° C. (see Yamamoto and others, published June 1954 in the monthly Journal by Nippon Yakugakukai Kinki Shibu) or 120° C. (page 132, No. 2, March 1955, Scientific Laboratory Report by Sakurai and others). In these reports, the water of crystallization present is disregarded. Furthermore, it has been reported that the melting point of the vitamin-$B_1$ bromide is 210° C. (Japanese Patent Publication No. 419/1952) or 180° C. (in the above-mentioned Journal), or 161° C.–162° C. (in the above-mentioned Scientific Laboratory Report). These reports also lack a disclosure relating to the water of crystallization and the isomer of the vitamin-$B_1$ bromide. In connection with the vitamin-$B_1$ iodide, it has been reported that the melting point of said iodide is 195° C. (in the above-mentioned patent publication) or 163° C. (in the above-mentioned Scientific Laboratory Report). As described above, the reported melting points of the vitamin-$B_1$ halide are manifold. The reason thereof seems to be mainly the impossibility of obtaining a highly pure product.

We have found also that when a hydrogen halide is reacted with the vitamin-$B_1$ halide obtained above, the vitamin-$B_1$ halide hydrohalide corresponding to said hydrogen halide can be produced. For instance, vitamin-$B_1$ bromide hydrochloride or vitamin-$B_1$ iodide hydrochloride can be obtained by reacting a suitable amount of hydrochloric acid with the vitamin-$B_1$ bromide or iodide, respectively. These substances are entirely novel.

The process of this invention can be represented by the following formulas.

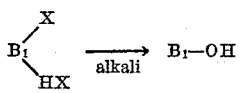

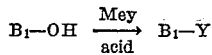

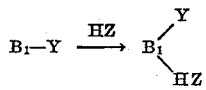

in which $B_1$ and Me represent, respectively, the vitamin-$B_1$ base and an alkaline metal, and X, Y and Z are different or like halogens, but Y must be different from Z in the Formula 3. As the alkaline substance of the Formula 1, any substance such as alkali carbonate, alkali bicarbonate and the like may be used as long as it can neutralize the vitamin-$B_1$ halide hydrohalide. As the acid of the Formula 2, alkali hyposulfite and alkali thiosulfate are preferably used, but a weak organic acid, for instance acetic acid, may be used for the same purpose. Any hydrogen halide can be used as the HZ of the Formula 3. The reaction in which the condition (X=Y=Z) is satisfied is industrially meaningless, because the reactions of the Formulas 1, 2 and 3 occur simultaneously to reproduce the starting substances.

The vitamin-$B_1$ halide prepared by this invention can be used as the starting substance for the useful monoacid salt. It has been proved in mice tests that the mixed halide hydrohalide has a high vitamin activity stronger than that of the conventional halide hydrohalide and more particularly, the vitamin-$B_1$ bromide hydrochloride has less toxicity and stronger vitamin activity than the vitamin-$B_1$ chloride hydrochloride.

Example 1

A solution was prepared by dissolving 16.7 g. of vitamin-$B_1$ chloride hydrochloride in 20 cc. of water.

To this solution was added little by little a solution consisting of 4 g. of sodium hydroxide and 36 cc. of water while cooling said solution with ice water. After about 30 minutes, sodium chloride was added to the reaction mixture to saturate it. To this saturated mixture was added a solution consisting of 10.4 g. of sodium hyposulfite and 20 cc. of water and then stirred, whereupon the crystals were deposited. In this case, the sodium hyposulfite may be replaced by 40 g. of sodium thiosulfate pentahydrate. After 30 minutes, the crystals precipitated were filtered out by suction and then recrystallized from 90% alcohol subjected to vacuum drying for one night, whereby 12 g. of cubic crystals of vitamin-$B_1$ chloride melting at 130° C. (decomposition point) was obtained with a yield of 80%.

(a) Elemental analysis for empirical formula:

$$C_{12}H_{17}N_4SOCl H_2O$$

(b) Calculated: C, 45.28; H, 5.97; N, 17.55; $H_2O$, 5.65
(c) Found: C, 45.86; H, 6.36; N, 17.91; $H_2O$, 5.45

Example 2

A solution was prepared by dissolving 3.3 g. of vitamin-$B_1$ hydrochloride in 2.5 cc. of water. To this solution was added little by little a solution consisting of 1.2 g. of sodium hydroxide and 20 cc. of water while cooling said solution with ice water. After about 30 minutes, sodium chloride was added to the reaction mixture to saturate it. To this saturated mixture was added a mixture of 3 g. of sodium bromide (or 4 g. of potassium bromide), 3 g. of sodium hyposulfite and 10 cc. of water and then stirred, whereupon crystals were deposited. After 30 minutes, the crystals precipitated were filtered out by suction and then recrystallized from 90% alcohol and subjected to vacuum drying for one night, whereby 2.6 g. of flaky crystals of vitamin-$B_1$ bromide hydrate melting at 164° C.–165° C. (decomposition point) was obtained with a yield of 70%.

(a) Elemental analysis for empirical formula:

$$C_{12}H_{17}N_4SBrO1\tfrac{1}{2}H_2O$$

(b) Calculated: C, 38.71; H, 5.38; N, 15.05; $H_2O$, 7.25
(c) Found: C, 39.20; H, 4.89; N, 15.35; $H_2O$, 7.05

Example 3

A solution was prepared by dissolving 1 g. of the vitamin-$B_1$ bromide hydrate obtained in Example 2 in 37 cc. of hot 95% alcohol. This solution was allowed to stand for two hours at a temperature of 40° C., whereupon crystals were deposited. These crystals were filtered out and dried, whereby 0.6 g. of vitamin-$B_1$ bromide melting at 189° C.–190° C. (decomposition point) was obtained.

(a) Elemental analysis for empirical formula:

$$C_{12}H_{17}N_4SBrO$$

(b) Calculated: C, 41.74; H, 4.93; N, 16.23
(c) Found: C, 41.89; H, 5.08; N, 15.93

Example 4

0.8 g. of the vitamin-$B_1$ bromide (the final product of Example 3) was dissolved in a small amount of water. Into this solution was poured acetone to extract the crystals. These crystals were recrystallized from 95% alcohol, whereby 0.59 g. of vitamin-$B_1$ bromide hydrate was obtained.

(a) Elemental analysis for empirical formula:

$$C_{12}H_{17}N_4SBrO1\tfrac{1}{2}H_2O$$

(b) Calculated: C, 38.71; H, 5.38; N, 15.05; $H_2O$, 7.25
(c) Found: C, 39.25; H, 5.79; N, 15.61; $H_2O$, 7.28

Example 5

A solution was prepared by dissolving 3.3 g. of vitamin-$B_1$ hydrochloride in 2.5 cc. of water. To this solution was added little by little a solution consisting of 1.2 g. of sodium hydroxide, 20 cc. of water and 6 g. of potassium iodide while cooling said solution with ice water. After about 30 minutes, sodium chloride was added to the reaction mixture to saturate it. To this saturated mixture was added a solution consisting of 3 g. of sodium hyposulfite and 10 cc. of water and then stirred, whereby the crystals were deposited. After 30 minutes, the crystals precipitated were filtered out by suction and then recrystallized from 90% alcohol with subsequent vacuum drying for one night, whereby 2.5 g. of flaky crystals of vitamin-$B_1$ iodide hydrate melting at 160° C. (decomposition point) was obtained with a yield of 60%.

(a) Elemental analysis for empirical formula:

$$C_{12}H_{17}N_4SIO1\tfrac{1}{2}H_2O$$

(b) Calculated: C, 34.37; H, 4.77; N, 13.35; $H_2O$, 6.44
(c) Found: C, 34.58; H, 4.96; N, 13.82; $H_2O$, 6.25

Example 6

3.7 g. of vitamin-$B_1$ bromide hydrate melting at 164° C.–165° C. was dissolved in a little amount of concentrated hydrochloric acid and the pH of this solution was adjusted to a value below 3.5. A suitable amount of acetone was added to the solution, whereupon crystals were deposited. The crystals precipitated were filtered out by suction and then redissolved in a small amout of water. This solution was permitted to stand after addition of 99% alcohol thereto and then the crystals precipitated were filtered out by suction, whereby 3.4 g. of needle crystals of vitamin $B_1$ bromide hydrochloride melting at 247° C.–248° C. (decomposition point) was obtained with a yield of 90%.

(a) Elemental analysis for empirical formula:

$C_{12}H_{18}N_4SBrClO$ (b) Calculated: C, 37.74; H, 4.72; N, 14.68
(c) Found: C, 37.84; H, 4.90; N, 14.36

Example 7

3.5 g. of vitamin-$B_1$ bromide melting at 189° C.–190° C. (decomposition point) was treated in the same manner as in Example 6, whereby 3.5 g. of the same final product as in Example 6 was obtained.

Example 8

4.2 g. of vitamin-$B_1$ iodide hydrate melting at 160° C. (decomposition point) was treated in the same manner as in Example 6, whereby 3.9 g. of prismatic crystals of vitamin-$B_1$ iodide hydrochloride melting at 220° C.–221° C. (decomposition point) was obtained with a yield of 90%.

(a) Elemental analysis for empirical formula:

$C_{12}H_{18}N_4SIClO$ (b) Calculated: C, 33.61; H, 4.20; N, 13.09
(c) Found: C, 33.18; H, 4.57; N, 13.46

Having thus described our invention, we claim:

1. A process for the preparation of vitamin-$B_1$ bromide hydrochloride which comprises: (1) treating a vitamin-$B_1$ halide hydrohalide of the formula

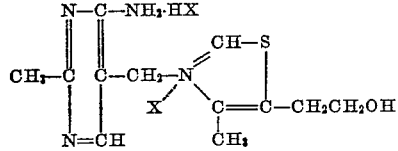

wherein X is a halogen selected from the group consisting of Cl and Br with at least two moles of an alkaline substance selected from the group consisting of the hydroxides, carbonates and bicarbonates of alkali metals in an aqueous medium, (2) adding an alkali bromide to the resulting solution of vitamin-$B_1$ base, (3) adjusting the pH of the solution thus obtained to about 6 with a weak acidic substance selected from the group consisting of alkali hyposulfite, alkali thiosulfate and acetic acid, (4) collecting the precipitated vitamin-$B_1$ bromide, and (5) treating the vitamin-$B_1$ bromide with hydrochloric acid to obtain vitamin-$B_1$ bromide hydrochloride.

2. A process for the preparation of vitamin-$B_1$ iodide hydrochloride which comprises: (1) treating a vitamin-$B_1$ halide hydrohalide of the formula

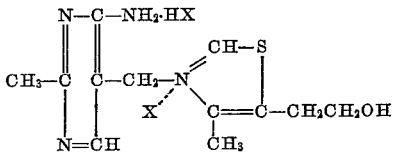

wherein X is a halogen selected from the group consisting of Cl and Br with at least two moles of an alkaline substance selected from the group consisting of the hydroxides, carbonates and bicarbonates of alkali metals in an aqueous medium, (2) adding an alkali iodide to the resulting solution of vitamin-$B_1$ base, (3) adjusting the pH of the solution thus obtained to about 6 with a weak acidic substance selected from the group consisting of alkali hyposulfite, alkali thiosulfate and acetic acid, (4) collecting the precipitated vitamin-$B_1$ iodide, and (5) treating the vitamin-$B_1$ iodide with hydrochloric acid to obtain vitamin-$B_1$ iodide hydrochloride.

References Cited in the file of this patent

UNITED STATES PATENTS

| | | |
|---|---|---|
| 2,597,329 | Howe et al. | May 20, 1952 |
| 2,844,579 | Turner et al. | July 22, 1958 |

FOREIGN PATENTS

| | | |
|---|---|---|
| 496,726 | Great Britain | Dec. 2, 1938 |
| 488,433 | Canada | Nov. 25, 1952 |
| 5429 ('53) | Japan | Oct. 21, 1953 |

OTHER REFERENCES

Williams et al.: Jour. Amer. Chem. Soc., vol. 57, pages 536–537 (1935).